United States Patent [19]

Ledet et al.

[11] Patent Number: 5,248,514
[45] Date of Patent: Sep. 28, 1993

[54] CURL CONTROL OF SHRIMP DURING STEAM COOKING

[75] Inventors: Brent A. Ledet, Metairie; George C. Lapeyre, New Orleans, both of La.

[73] Assignee: The Laitram Corporation, Harahan, La.

[21] Appl. No.: 865,936

[22] Filed: Apr. 9, 1992

[51] Int. Cl.⁵ .............................................. A22C 29/00
[52] U.S. Cl. .................................. 426/523; 99/443 C; 426/510; 426/524
[58] Field of Search ............... 426/510, 511, 523, 524; 99/443 C, 477, 516; 62/62, 63, 64, 373

[56] References Cited

U.S. PATENT DOCUMENTS

| | | | |
|---|---|---|---|
| 3,540,369 | 11/1970 | Brooks | 99/426 |
| 3,581,652 | 6/1971 | Chauvin | 99/443 C |
| 3,733,202 | 5/1973 | Marmor | 99/404 |
| 3,975,797 | 8/1976 | Grimes et al. | 99/443 C |
| 4,754,699 | 7/1988 | Cope et al. | 99/404 |
| 4,862,794 | 9/1989 | Lapeyre et al. | 99/443 C |

Primary Examiner—George Yeung
Attorney, Agent, or Firm—Laurence R. Brown; James T. Cronvich

[57] ABSTRACT

Shrimp are cooked by methods and apparatus limiting the excessive amount of curl usually incurred to produce a generally J shaped configuration after cooking. Thus, the shrimp are cooked while held in a straightened configuration to thus induce in the cooked shrimp meat forces tending to hold the shrimp in a more straightened configuration than conventionally attained. In one embodiment the shrimp are aligned on conveyor belts between pairs of laterally disposed pan normally extending from the conveying surface and spaced for confining the shrimp in an elongated and straightened configuration. Thus, the conveyor belt carries the shrimp through a steam cooker to produce a desired J shaped shrimp configuration having reduced curl. In a further embodiment, the shrimp are prefrozen in straightened configuration and cooking rate at the cooker is controlled to thaw and cook the outside of the shrimp while the center portion remains frozen to cause the cooked shrimp meat to induce in the shrimp force tending to hold the shrimp in a straightened configuration thus reducing the amount of curl as the center portion is thawed and cooked.

9 Claims, 2 Drawing Sheets

CURL CONTROL OF SHRIMP DURING STEAM COOKING

TECHNICAL FIELD

This invention relates to the cooking of shrimp and more particularly it relates to the reduction of the curling that cooked shrimp meat exhibits after cooking.

BACKGROUND ART

There have been prior art attempts to control the shape of cooked shrimp in such a manner that there is a reduction in the curling that cooked shrimp meat exhibits after cooking. Thus, for example, Hice U.S. Pat. No. 3,540,369, Nov. 17, 1970 discloses specially shaped shrimp cooking trays which are placed in a cooker. The trays have either a shaped wire mesh shrimp retaining and shaping platform configuration or a set of relatively large diameter cylindrical stems about which shrimp are placed for cooking with the stems covered by a mesh screen for holding completely shelled shrimp in a configuration during cooking that prevents the shrimp from coiling into tight circles. However, these trays must be removed from a cooker and handled to dump the shrimp and in general are not subject to automated cooking procedures where commercial quantities are required, and are thus limited to those applications where small quantities of shrimp are hand loaded and cooked, such as in homes or restaurants. Furthermore they are not suitable for cooking fully or partly shelled shrimp.

The Chauvin U.S. Pat. No. 3,581,652, Jun. 1, 1971 uses a conveyor belt-cooker system for producing cooked shrimp in a generally straight or slightly curled condition. This requires the squeezing of shrimp between two tightly stretched conveyor belts to retain them firmly in position during cooking. The upper belt is weighted down to increase holding pressure for maintaining an originally straight shrimp tightly clamped in that condition throughout cooking over a controlled speed cooking cycle so that the cooked shrimp are substantially straight.

However this method has significant disadvantages of merging two conveyor belts, maintaining heavy pressure on top of the shrimp, preventing normal and natural expansion of the meat during cooking, blocking and reducing steam flow passages about the shrimp while cooking, and misshaping or branding and possibly tearing the shrimp during the conveyance procedure.

It is therefore an objective of this invention to provide improved shrimp cooking methods and apparatus for overcoming the disadvantages of the prior art.

It is a further object of the invention to provide high grade J-shaped cocktail shrimp of good appearance and texture in a high volume commercial processing method.

Another object of the invention is to provide improved methods and apparatus for cooking shrimp in a substantially J-shaped configuration.

DISCLOSURE OF THE INVENTION

An improved cooking method is afforded by this invention whereby shrimp loosely lying on a single conveyor belt surface may be cooked in commercial quantities by conveyance through a steam heat cooker at controlled speeds and cooking temperatures.

In a first embodiment, the shrimp are fitted in a conveyor bin formed in a conveyor belt holding them in a straightened configuration. Thus, the shrimp are hand loaded to lie in a straight position between critically spaced flights or panels transverse to and extending normally from the surface of the conveyor belt. The critical panel spacing thus permits the flights in transit through a cooker to confine the shrimp in a substantially straight permanent posture without compression of or damage to the shrimp meat during the cooking process. The conveyor belt is formed of successive articulated links with articulation joints positioned between the confining panels so that the cooked shrimp ma be readily discharged from the confining bins by the articulation joints as they pass over a sprocket at the discharge station.

In another embodiment of the invention, the shrimp are frozen before cooking in their straight configuration, and thus may be processed in a boiler or may be carried on the conveyor through a cooking chamber without requiring the confining bins. The cooking is controlled by belt speed and cooker temperature at a cooking rate which first thaws out and cooks the outside of the shrimp with the inner unthawed part held straight. Thus the cooked outer shrimp meat layer provides a force maintaining the shrimp in the straight elongated condition as the inner part of the shrimp is thawed and cooked, resulting in the desired J-shaped cooked shrimp.

Other features, advantages and objectives of the invention will be found throughout the following text, drawings and claims.

BRIEF DESCRIPTION OF THE DRAWINGS

The accompanying drawing embodies like reference characters in the several views for similar features to facilitate comparison. In these drawings.

THE PREFERRED EMBODIMENT

Figure 1:
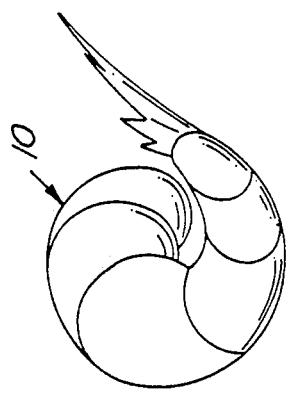
FIG. 1 is a perspective sketch of a cooked shrimp in a normal tightly curled configuration.

The cooked shrimp shown in FIG. 1 is conventionally cooked so that the body 10 is tightly curled. However the bodies 11 of the shrimp in FIG. 2, unconventionally cooked, are substantially J-shaped and preferred for handling as "cocktail" shrimp, for example.

Figure 3:
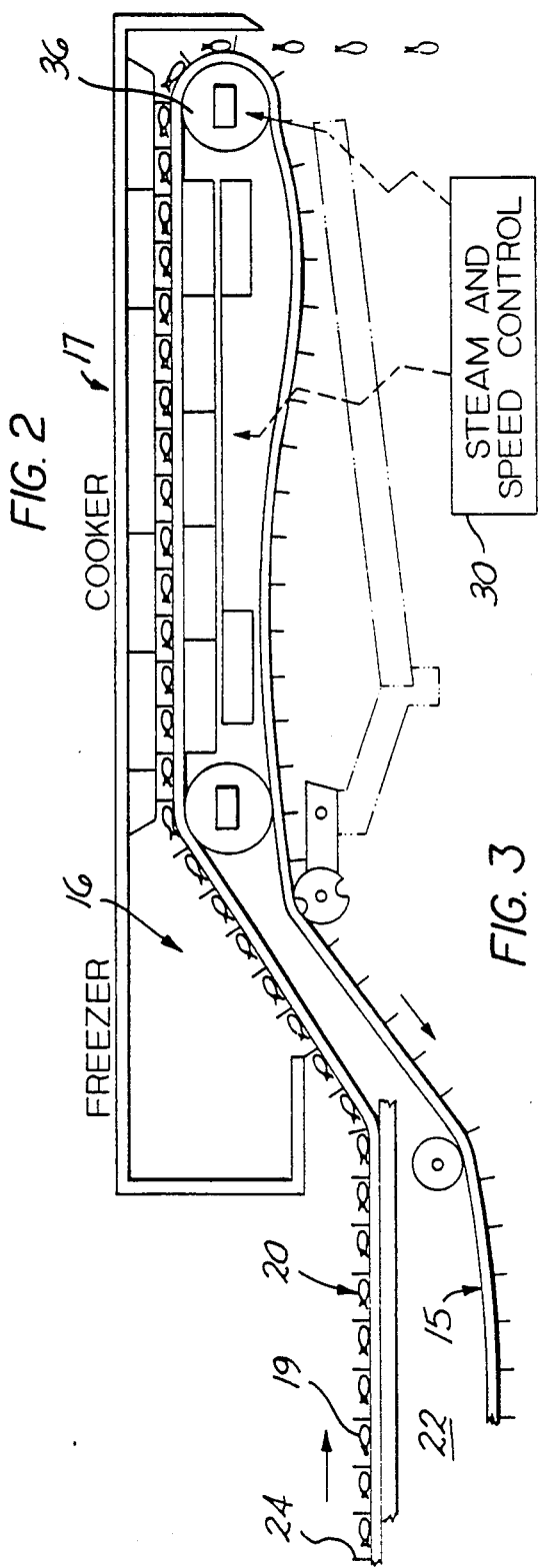
FIG. 3 is a side view sketch of a shrimp conveyor and cooker system for cooking shrimp to attain the desired J-shape in commercial quantities.
Figure 4:
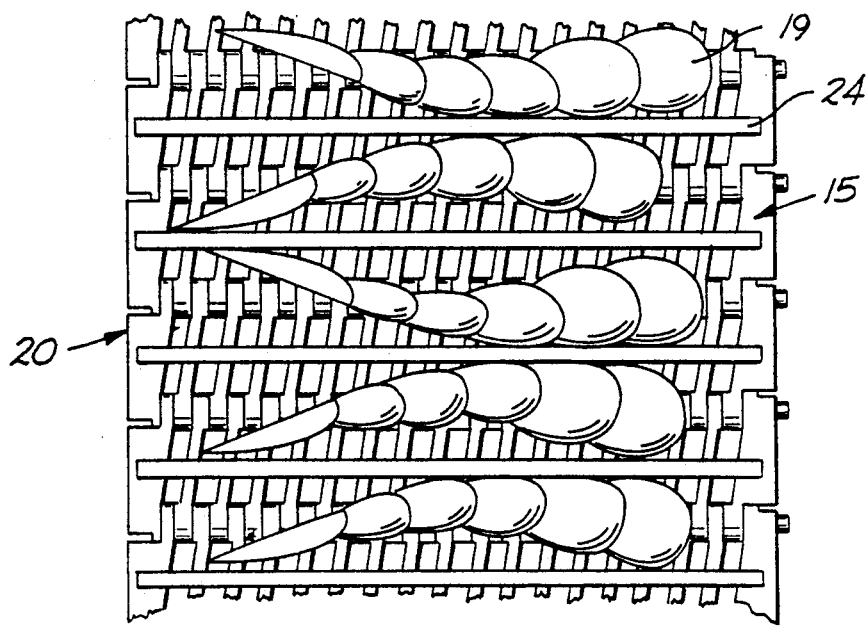
FIG. 4 is a plan fragmental view of a conveyor belt constructed for retaining shrimp in a straight position to prevent excessive curl during cooking.
Figure 5:
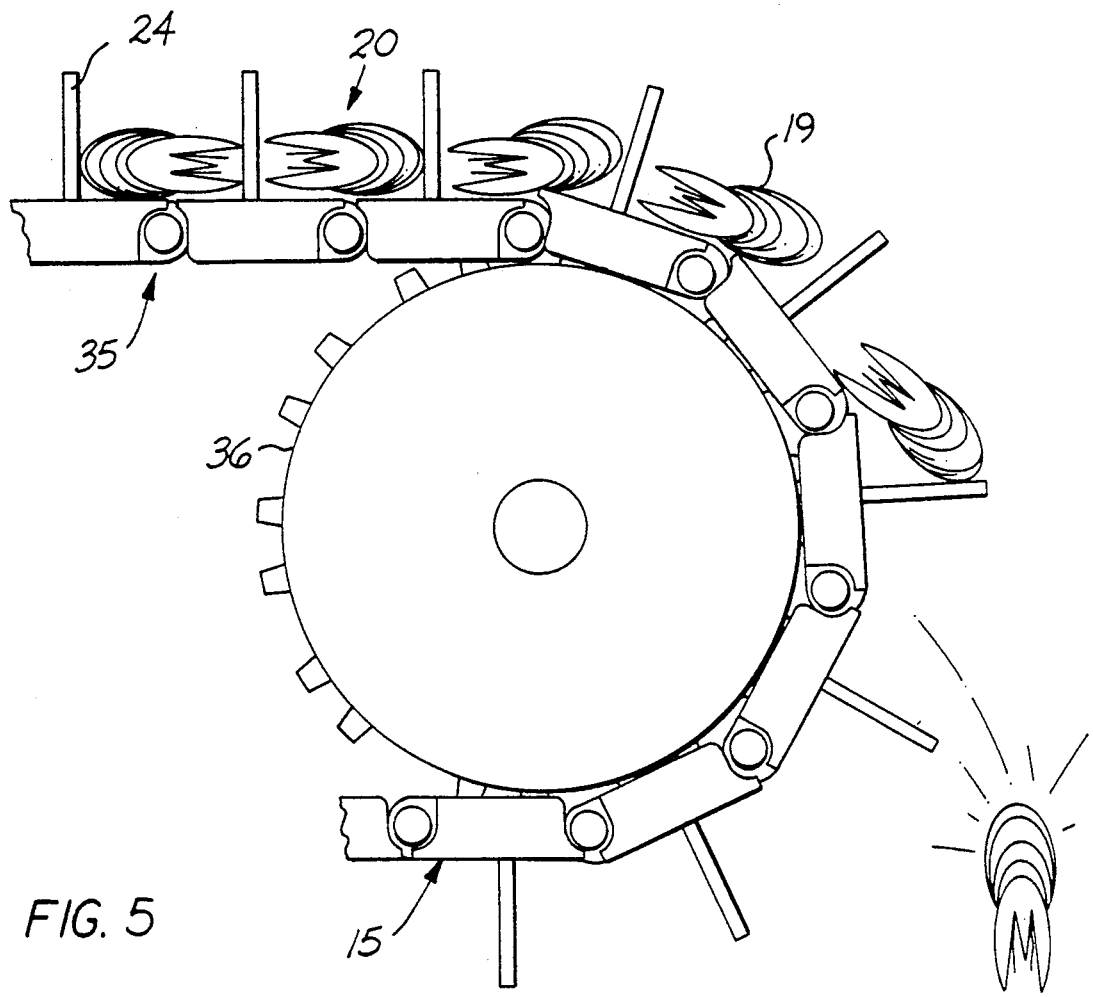
FIG. 5 is an enlarged side view of the conveyor belt at a discharge station where it articulates about a sprocket.

The unconventional cooking is achieved in accordance with this invention by means of the apparatus sketched in FIGS. 3 to 5 and corresponding cooking methods. For the production of commercial quantities, the shrimp are continuously processed on specially constructed conveyor belts 15 which pass at least through a freezer 16 or a cooker 17. Thus the conveyor belt has critically sized open top compartments 20 for loosely confining shrimp in a substantially straight position while undergoing either the freezing or cooking process while carried on the belt, or conceivably both freezing and cooking in that sequence.

Figure 2:
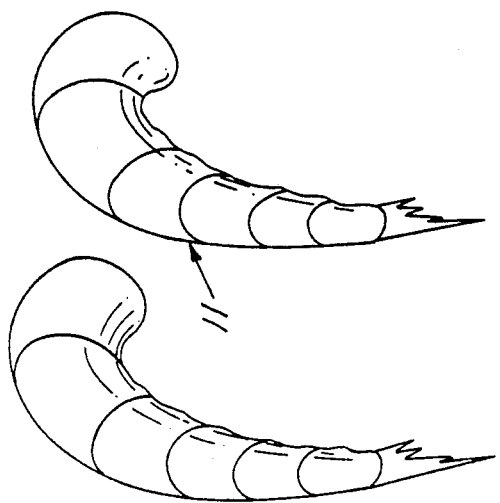
FIG. 2 is a perspective sketch of a pair of cooked shrimp in a J-shaped ideal configuration for use as cocktail shrimp for example.

Thus, in accordance with this invention the shrimp are constrained against curling or coiling as shown in FIG. 1 during the cooking process so that the proteins can coagulate and take their "set" in a nearly straight position to produce the substantially J-shaped shrimp of FIG. 2. However, the loose confinement in the compartments 20 does not significantly disfigure the shrimp body or prevent it from normal swelling during the cooking step.

In a preferred conveyor embodiment of the invention, the shrimp 19 are hand fed into the compartments 20 at the feeding station 22 so that they are positioned in the nearly straight position shown in FIG. 4. The shrimp are confined by means of two successive ones of the panels or flights 24 laterally disposed across the conveyor belt surface and extending normally therefrom. Thus, the spacing of the flights 24 is critical with relation to shrimp size, although it can be somewhat greater than the shrimp body (11) width. This permits simple manual entry and maintains the shrimp straight enough during cooking that they uncurl when released into their preferred J-shape (FIG. 2). The nominal spacing of the flights 24, center to center, typically is one inch (2.54 cm), with a height that extends above the shrimp 19 when placed in the compartments 20.

In one embodiment of the invention, the shrimp 19 are passed by conveyor belt 15 through the freezer compartment 16 and are frozen while in their straight position. Then the shrimp may be cooked either on the conveyor belt or in unconfined position in a suitable cooker, such as 17 generally conforming to the operating conditions set forth in George C. Lapeyre, et al. U.S. Pat. No. 4,862,794, Sep. 5, 1989. Alternatively the stored frozen shrimp may be simply boiled when ready for use. As the shrimp begins to cook, the outer skin thaws first and takes its "set" in the straight position. This provides forces for holding the shrimp straight as the middle thaws out and becomes cooked, so that the shrimp are cooked with much less curl than in the FIG. 1 example. For this cooking process on conveyor 15 of FIG. 3, the cooking rate may be optimized by cooker controls for steam and belt speed as typified by block 30.

In another embodiment of the invention, raw unfrozen shrimp are passed through only the steam cooking chamber 17 in the compartments 20 for cooking. The tendency to curl is curtailed by confinement within the panels 24 as the shrimp is cooked and thus they take their "set" into the nearly straight position. When removed from the compartments, there is a limited curl with the shrimp taking the FIG. 2 J-shaped configuration.

The belt, when hinged for articulation between the panels 24, such as at 35, FIG. 5, the additional advantage occurs in conveyor belt 15, in that the shrimp are loosened from their compartments and discharged during articulation as the belt passes over the sprocket wheel 36 which constitutes a discharge station.

It is therefore evident that the cooking methods and conveyor apparatus for holding shrimp, either in shell or shelled, straight during the cooking process without restraining forces that tend to crush the shrimp or keep it from expanding in the thermal cooking process have advanced the state of the art. The conveyor belt construction for processing shrimp is novel and provides a new utility of holding shrimp straight until they take a set by freezing or cooking so that they can be processed in commercially useful quantities. Having therefore advanced the state of the art, those novel features describing the nature and spirit of the invention are defined with particularity in the following claims.

We claim:

1. The method of cooking shrimp conveyed on a conveyor belt through a cooking station to attain a substantially permanent J shaped cooked configuration, comprising the steps of:

orienting shrimp on a conveyor belt to lie on the belt, said shrimp being confined in a substantially straight posture outside a cooking station, moving the shrimp by conveyance on the belt into the cooking station while lying loosely confined on the belt, and cooking the shrimp during movement of said conveyor belt through the cooking station while residing loosely confined on the belt in an arrangement permitting thermal expansion and contracting of cooked shrimp meat during a cooking period at least partially cooking the shrimp while in said confined substantially straight posture thereby to set the shrimp meat by cooking into said substantially permanent J shaped configuration.

2. The method of claim 1 wherein the orienting step further comprises the step of freezing the shrimp in said substantially straight posture and wherein the cooking step further comprises cooking the shrimp from the outside inwardly while the inward portion is frozen to generate forces in an outer cooked portion tending to maintain the shrimp in its straight posture when the inner frozen portion of the shrimp is thawed and cooked.

3. The method of claim 1 wherein the orienting step further comprises the step of providing confining panels in the conveyor belt and normally extending from the conveyor belt, the panels being sized for holding said shrimp loosely confined in said substantially straight posture within the panels throughout the cooking step.

4. The method of claim 3 further comprising the steps of laterally extending the panels across the belt surface, hinging the conveyor belt between the panels and passing the belt about a hinging station after cooking for discharging the cooked shrimp from the conveyor belt panels.

5. The method of cooking shrimp to control and reduce curling comprising the steps of freezing shrimp in a substantially straight configuration and cooking the frozen shrimp from the outside inwardly to maintain the straight configuration by a frozen inner portion and thereby generate forces in an outer cooked portion tending to restrict further curling of the shrimp as the inner portion is cooked.

6. The method of freezing shrimp in a substantially straight position by means of confining the shrimp loosely in a compartment on a conveyor belt in a straight position and passing the conveyor belt through a freezing chamber to freeze the shrimp in said straight position.

7. The method of cooking shrimp in a substantially straight position by means of confining the shrimp loosely in a substantially straight position in compartments carried by a conveyor belt and passing the conveyor belt through a cooking chamber to produce cooked shrimp with the shrimp loosely confined in said substantially straight position.

8. The method of cooking shrimp that reduces curling from forces in cooked shrimp meat to thereby produce a cooked shrimp product shaped in a substantially J configuration, comprising the steps of:

provinding a conveyor belt having lateral panels across the belt extending normally from a conveying surface of the belt above the surface of the shrimp in a spaced pattern for confining the shrimp in a straightened position lateral to the belt, orienting shrimp between the panels in a straightened position, and moving the shrimp through a cooker on the belt in the straightened position thereby to take a set by means of cooked meat forces that retain the shrimp in said J configuration.

9. The method of claim 8 further comprising the steps of:

hinging said conveyor belt between the lateral panels, and discharging cooked shrimp from the belt by hinging the belt over a sprocket wheel discharge station.

* * * * *